(12) United States Patent
Tejima

(10) Patent No.: US 7,500,676 B2
(45) Date of Patent: Mar. 10, 2009

(54) SLIDING ELEMENT

(75) Inventor: Yoshihiro Tejima, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 10/403,002

(22) Filed: Apr. 1, 2003

(65) Prior Publication Data

US 2003/0189294 A1     Oct. 9, 2003

(30) Foreign Application Priority Data

Apr. 2, 2002   (JP) .............................. 2002-100512
Jul. 29, 2002  (JP) .............................. 2002-219792

(51) Int. Cl.
*F16J 9/12* (2006.01)
*F16J 15/34* (2006.01)
(52) U.S. Cl. ...................... 277/399; 277/400
(58) Field of Classification Search .......... 277/399–402
See application file for complete search history.

(56) References Cited

U.S. PATENT DOCUMENTS 5,092,612 A * 3/1992 Victor et al. ................ 277/400
5,492,341 A * 2/1996 Pecht et al. ................. 277/400
5,952,080 A * 9/1999 Etsion et al. ................ 428/156
6,149,160 A * 11/2000 Stephens et al. ............ 277/399
6,152,452 A * 11/2000 Wang .......................... 277/400
6,341,782 B1 * 1/2002 Etsion ......................... 277/399
6,655,693 B2 * 12/2003 Hosanna et al. ............. 277/358
6,705,844 B2 * 3/2004 Englander ................ 417/423.4

FOREIGN PATENT DOCUMENTS

| JP | 57161368 A | * | 10/1982 |
| JP | 59231269 A | * | 12/1984 |
| JP | 04078379 A | * | 3/1992 |
| JP | 04145267 A | * | 5/1992 |
| JP | 09133222 A | * | 5/1997 |
| JP | 11236976 A | * | 8/1999 |

* cited by examiner

*Primary Examiner*—Vishal Patel
(74) *Attorney, Agent, or Firm*—Arent Fox LLP

(57) ABSTRACT

A primary objective of the present invention is to decrease the friction coefficient of the sliding face of a sliding element and to improve its seal performance. The sliding element disposes a plurality of elongate dimples in its first sliding face in which forward edges of the dimples relative to a rotational direction are inclined with respect to a tangential direction of a rotational circumference. The sliding element also disposes a second sliding face which has either a plane surface or second dimples and is located in the opposite side of the first sliding face relative to the process fluid.

3 Claims, 9 Drawing Sheets

-- PRIOR ART --

SLIDING ELEMENT

BACKGROUND OF THE INVENTION

1. Field of the Invention

The present invention relates generally to a relatively rotating sliding element. More particularly, the invention relates to a sliding element which reduces a friction coefficient on its sliding face and provides an effective seal for a process fluid on the sliding face.

2. Description of the Related Art

Related art of the present invention on a silicon carbide sintered element is found in U.S. Pat. No. 5,080,378. The description and drawings disclose a mechanical seal whose cross sectional view is shown in FIG. 8.

The mechanical seal is used in pumps, refrigerators or the like.

In FIG. 8, a mechanical seal 100 is located between a rotary shaft 130 and a housing 140. The mechanical seal 100 is used for sealing a fluid in pumps, refrigerators or the like.

In this mechanical seal 100, a seal ring 101 made of sintered porous silicon carbide is fitted over the rotary shaft 130. The rotary seal ring 101 retains a seal face 102 on its side surface. Furthermore, packings 120A, 120B are disposed in a step shoulder 103 of the inner diameter surface of the rotary seal ring 101 to seal against the rotary shaft 130.

The packings 120A, 120B are pressed by a gland ring 105 and seal the interface of the rotary shaft 130 and the rotary ring 101. A support ring 109 which is fixed to the rotary shaft 130 by means of a socket screw 108 supports a spring element 106, and the gland ring 105 is resiliently urged by the spring element 106.

An opposing seal face 111 which forms a slidably sealing contact with the seal face 102 is disposed in a fixed ring 110. The fixed ring 110 is secured via O-rings 115,115 to a bore of the housing 140 through which the rotary shaft 130 extends.

This fixed ring 110 is made of carbon.

In a conventional mechanical seal 100 arranged as mentioned above, the seal ring 101 and the fixed seal ring 110 slide with respect to each other while maintaining a sealing therebetween in order to seal a higher pressure side P1 from a lower pressure side P2.

The seal ring 101 has a sintered silicon carbide body in which spherical pores whose average diameter is in a range of from 0.010 mm to 0.040 mm are spread within its crystalline structure and a lubricant captured inside the pores improves its sliding resistance.

The pores located in the sliding face of the sintered silicon carbide body are fabricated by adding polystyrene beads in a pre-sintering process and then resolving and sublimating them in a temporary sintering. This process provides a sintered silicon carbide body with a plurality of pores isolating from each other and scattered inside the crystalline structure of crystal grains. From a fabrication standpoint, a difficulty in high compression molding causes a decrease in dimensional accuracy of the molded product.

Also polystyrene beads resolved in the sintering process decreases strength of a sintered material as a sliding element. These pores are simply arranged at random on the sliding face and a mere preservation of lubricant in the pores does not yield decrease of the friction coefficient of the sliding face as expected.

There is an enhanced version of mechanical seal shown in FIG. 9 which improves the aforementioned problems in terms of the strength decrease and the process fluid leakage of a sliding element.

This mechanical seal has the same constitution as what is shown in FIG. 8. The sliding face of a fixed ring, not shown in the figure, retained in the housing forms a sealing contact with the sliding face of a driven ring securely attached to the rotary shaft as shown in FIG. 9 for sealing a process fluid.

The sliding face 155A of the driven ring 155 retains a lot of concaves 156. Minimum width of the concave 156 is in a range of from $30 \times 10^{-6}$ m to $100 \times 10^{-6}$ m while the maximum width is in a range of from $60 \times 10^{-6}$ m to $500 \times 100^{-6}$ m. Moreover, the maximum width is more than twice in dimension of the minimum width. The concaves 156 are oriented at random relative to a rotational direction of the sliding face 155A.

The concaves 156 serve a purpose of preserving a process fluid which enters into between the sliding face 155A of the driven ring 155 and the sliding face of the fixed ring. That is, the process fluid entering from the outer circumference side of the driven ring is trapped and stored in the concave 156 before the fluid reaches the inner circumference edge. The fluid stored in the concave 156 is pushed toward the circumferentially backward direction of the concave 156 due to viscosity of the fluid and rotary motion of the driven ring, and a portion of the fluid exceeding the storage capacity of the concave starts to leak from the outer circumferential edge of the concave 156, which moves between the relatively sliding faces and is eventually trapped by an adjacent concave 156.

Thus, the process fluid is pushed toward the outer circumferential edge and to the backward direction relative to the rotary motion of the sliding faces.

Dimension of the concave 156 is so small not only that it can not provide enough force to retain the process fluid on the sliding face but also that it does not induce enough pumping effect to push back the process fluid to where it comes from. Therefore, neither decrease of the friction coefficient of the sliding face of the driven ring 156 nor decrease of the heat generation due to sliding friction can be expected. Also it is difficult to reduce a sliding resistance in case of a slow rotational speed of the driven ring.

Also there has been other prior art sliding element for mechanical seals. The sliding face of the sliding element for mechanical seals disposes a plurality of dimples lined up like a groove along a longitudinal direction which is vertical to a sliding direction.

Dynamic pressure generated within the dimples is fairly large. Thus, a lubricant oil film of the fluid formed is so thin that the lubricant oil preserved in the dimples does not provide a long-term reduction effect of the friction coefficient of the sliding faces.

The present invention is introduced to resolve the above mentioned problems. A primary technical goal which this invention tries to achieve is to form a film of process fluid on a sliding face for reducing a frictional resistance and enhancing a seal performance. Another goal is to prevent heat generation on the sliding face. Yet another goal is to prevent a wear of the sliding face for a long-term assurance of the performance of the sliding faces.

Yet another goal is not only to prevent a decrease of a seal performance of the sliding element at a slow rotational speed but also to reduce a frictional resistance at such a slow speed.

SUMMARY OF THE INVENTION

A primary object of the present invention is to resolve the above mentioned technical problems, and a solution to such problems is embodied as follows.

A preferred embodiment of a sliding element constructed in accordance with the principles of the present invention is a sliding element for providing a seal against a process fluid between sliding faces of a pair of relatively slidable components, one of the components being a stationary sliding element and the other being a rotary sliding element, and the process fluid being located around either inner circumference or outer circumference of the sliding faces.

A first sliding face of a pair of sliding faces is located on the process fluid side and a second sliding face is on the other side. The first sliding face has dimples whose longitudinal direction is inclined relative to a tangential line which is defined with respect to a rotational direction of the sliding face. The second sliding face, on the other hand, is a plane surface or has second dimples which are smaller than the dimples on the first sliding face.

A sliding element as a preferred first embodiment related to the present invention retains a second sliding face with a sealing function which is disposed on the process fluid side, and the dimples disposed on the first sliding face forms a thick lubricant film by sucking in a process fluid for decreasing a friction coefficient of the sliding face because the longitudinal direction of the dimples of the first sliding face is inclined inwardly or outwardly relative to a tangential line which is defined with respect to a rotational direction of the first sliding face.

Sealing the lubricant film formed on the first sliding face by means of the second sliding face is expected to exhibit an improved seal performance against the fluid as well as a lubrication effect. In addition, in case of a low rotational speed of the sliding face, it not only enhances the seal performance but also decreases the friction coefficient.

A sliding element as a preferred second embodiment related to the present invention is a sliding element for providing a seal against a process fluid between sliding faces of a pair of relatively slidable components, one of the components being a stationary sliding element and the other being a rotary sliding element, and the process fluid being located around either inner circumference or outer circumference of the sliding faces. One of the sliding faces which is located in the process fluid side is a first sliding face and the other which is located in the opposite side of the process fluid is a second sliding face. A plurality of at least one kind of dimples are disposed on the first sliding face in which the shape of the dimples is either elliptic or rectangle and the longitudinal direction of the dimples is inclined relative to a tangential line which is defined with respect to a rotary motion of the first sliding face such that the forward edge of the dimples along its longitudinal direction becomes closer to a circumferential edge which is located in the process fluid side. For the size of the dimples, a maximum width is in a range of from $100 \times 10^{-6}$ m to $1000 \times 10^{-6}$ m, and a longitudinal length is more than $500 \times 10^{-6}$ m which is larger than the width as well as smaller than the radial length of the first sliding face. Groove depth of the dimple is in a range of from $1 \times 10^{-6}$ m to $25 \times 10^{-6}$ m, and the second sliding face either has a plane surface or has second dimples on its face which are smaller than the dimples on the first sliding face.

In the sliding element of the present invention related to the second embodiment, the dimples disposed on the first sliding face decreases the friction coefficient of the sliding face, and the lubricant film formed on the first sliding face sealed by the second sliding face is expected to exhibit an improved seal performance against the fluid as well as a lubrication effect.

Therefore, a friction coefficient of the sliding face is decreased while seal performance of the sliding face against the process fluid is enhanced as well. In particular, the sliding element exhibits both a good seal performance against the fluid and a reduced friction coefficient at a low rotational speed.

A sliding element as a preferred third embodiment related to the present invention is a sliding element for providing a seal against a process fluid between sliding faces of a pair of relatively slidable components, one of the components being a stationary sliding element and the other being a rotary sliding element, and the process fluid being located around either inner circumference or outer circumference of the sliding faces. One of the faces is a first sliding face and second sliding faces are located on both sides of the first sliding face. A plurality of at least one kind of dimples are disposed on the first sliding face in which the shape of the dimples is either elliptic or rectangle and the longitudinal direction of the dimples is inclined relative to a tangential line which is defined with respect to a rotary motion of the first sliding face such that the forward edge of the dimples along its longitudinal direction becomes closer to a circumferential edge which is located in the process fluid side. For the size of the dimples, a maximum width is in a range of from $100 \times 10^{-6}$ m to $1000 \times 10^{-6}$ m, and a longitudinal length is more than $500 \times 10^{-6}$ m which is larger than the width as well as smaller than the radial length of the first sliding face. Groove depth of the dimple is in a range of from $1 \times 10^{-6}$ m to $25 \times 10^{-6}$ m, and the second sliding face either has a plane surface or has second dimples on its face which are smaller than the dimples on the first sliding face.

A sliding element as a preferred third embodiment related to the present invention sucks in a process fluid onto a first sliding face and sealingly retains a lubricant film formed on the first sliding face by means of a second sliding face for not only exhibiting a lubrication effect but also significantly improving a seal performance against the process fluid with the first sliding face and the second sliding face which is located in the opposite side of the fluid.

Thus, the sliding face significantly enhances its seal performance against the process fluid. At the same time, the sealed lubricant film is able to decrease a friction coefficient of the sliding face. Also, in case of a low rotational speed of the sliding face, it not only enhances the seal performance but also drastically decreases the friction coefficient.

DETAILED DESCRIPTION OF THE INVENTION

Figure 1:
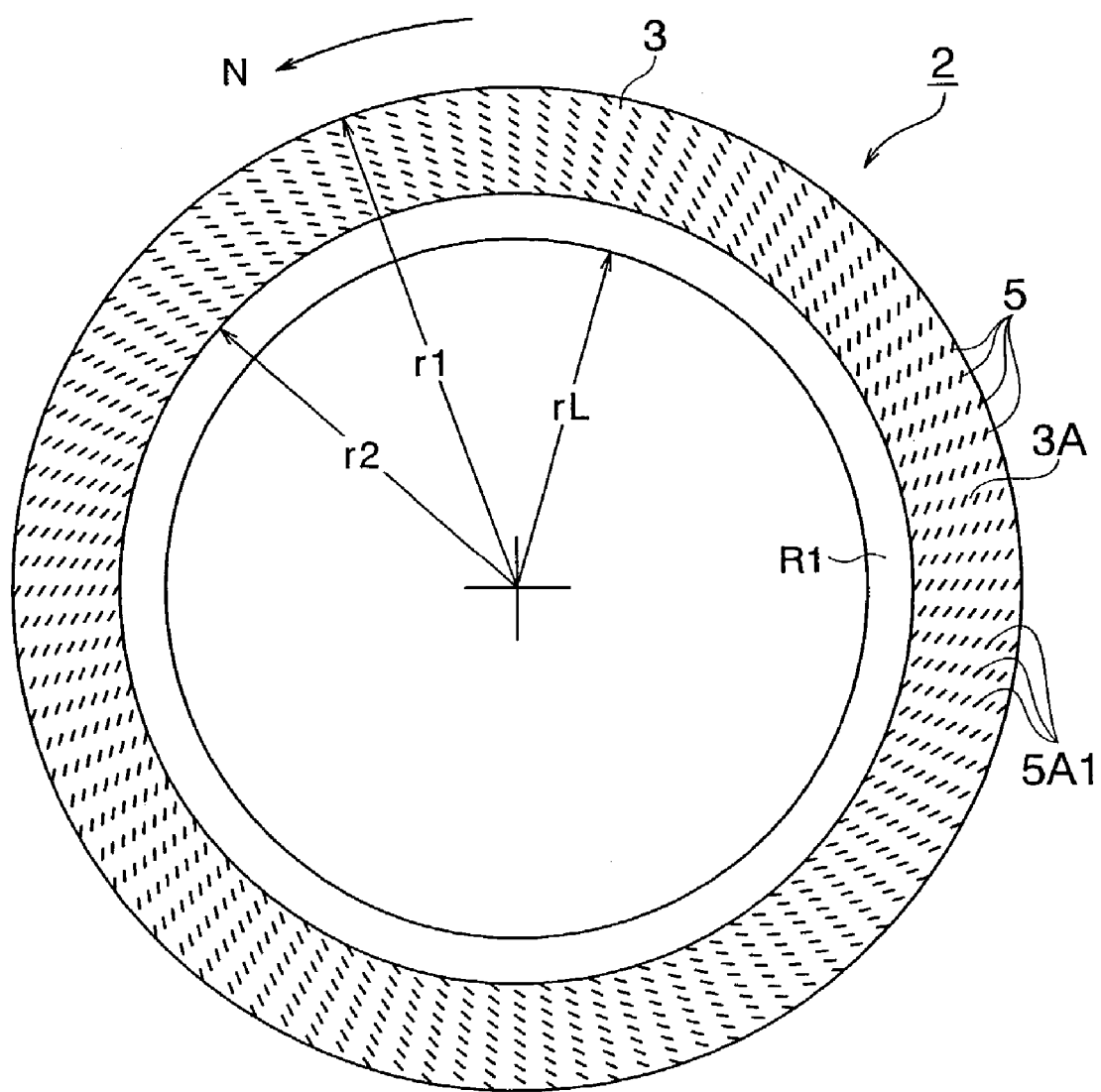
FIG. 1 is a front view of a sliding face of a sliding element representing a first preferred embodiment related to the present invention.

Described below is details of the figures of preferred embodiments of a sliding element of the present invention according to actual design drawings with accurate dimensional relations. FIG. 1 shows a sliding face of a sliding element representing a preferred first embodiment related to the present invention.

Figure 2:
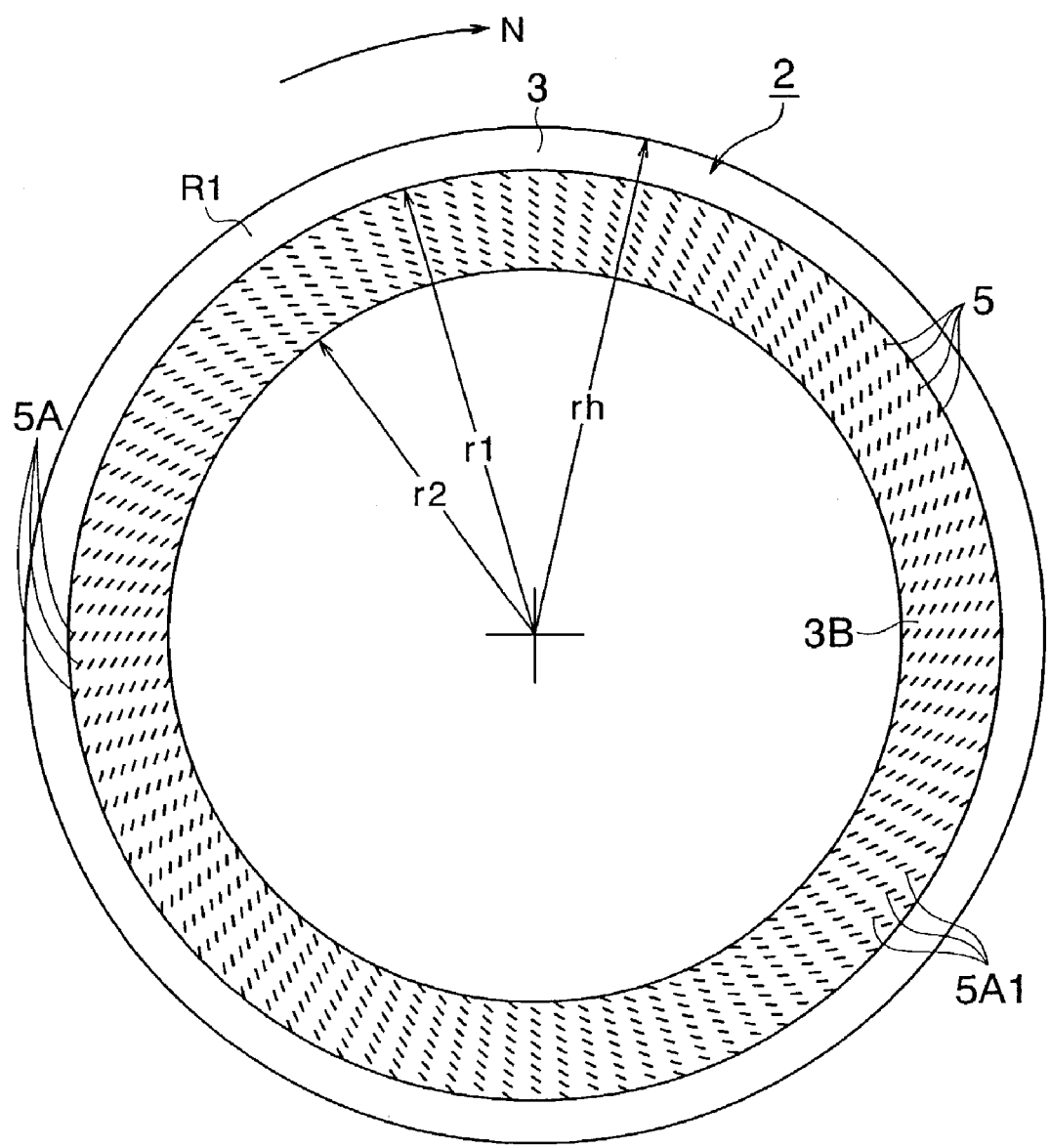
FIG. 2 is a front view of a sliding face of a sliding element representing a second preferred embodiment related to the present invention.

>Also FIG. 2 shows a sliding face of a sliding element representing a preferred second embodiment related to the present invention.

Figure 3:
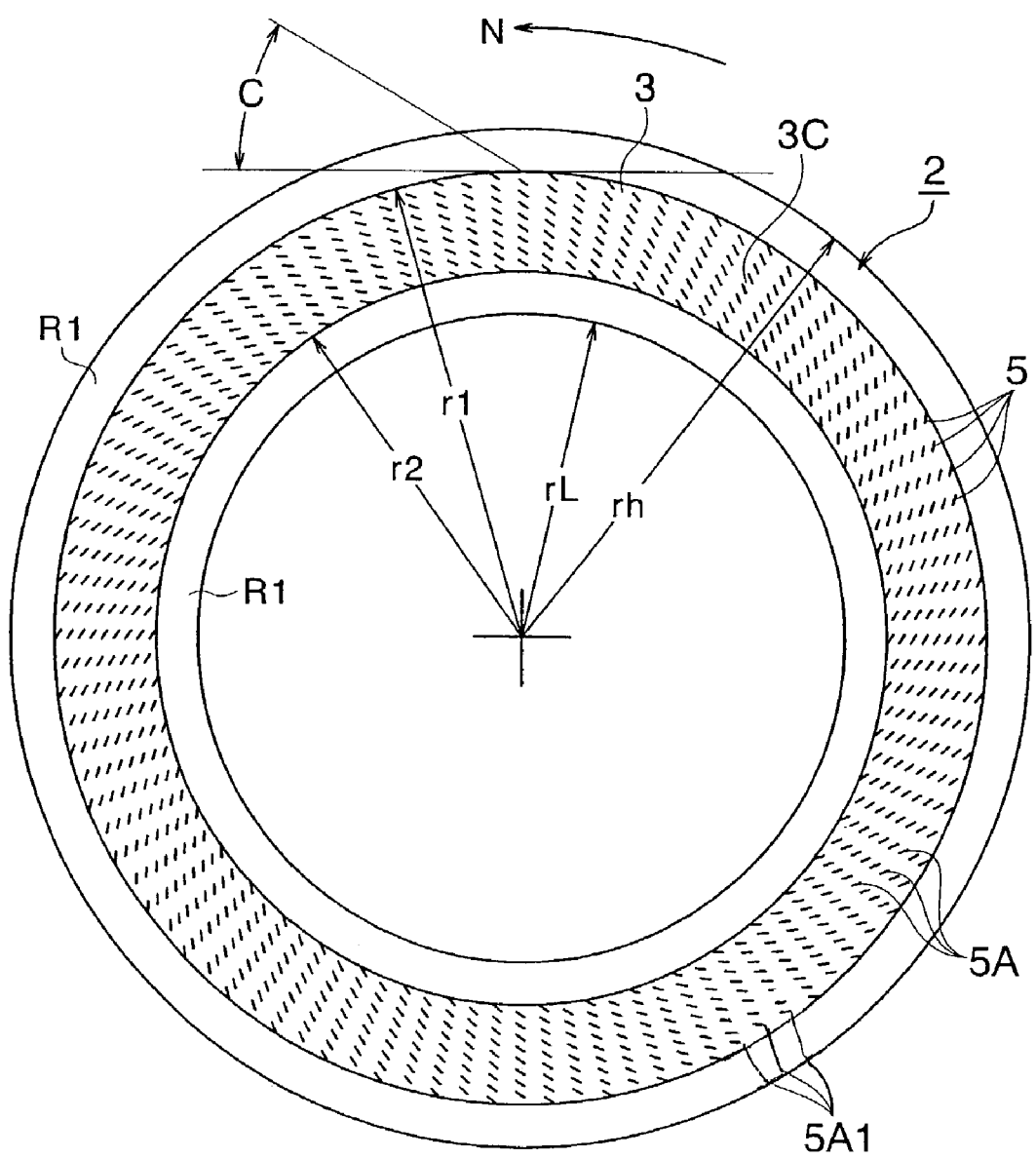
FIG. 3 is a front view of a sliding face of a sliding element representing a third preferred embodiment related to the present invention.

>FIG. 3 further shows a sliding face of a sliding element representing a preferred third embodiment related to the present invention.

Figure 4:
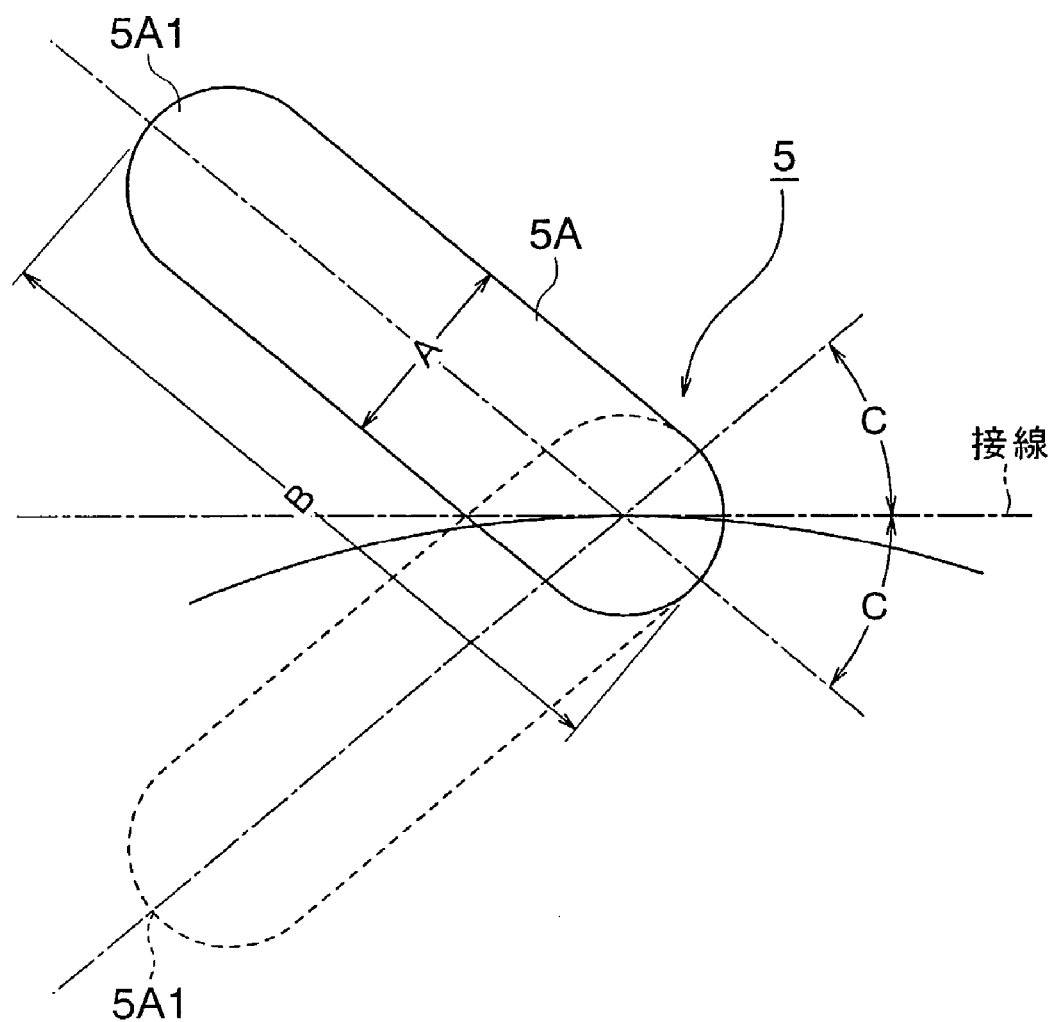
FIG. 4 is an enlarged top view of a single dimple out of the dimples disposed on a sliding face of a sliding element related to the present invention.

>FIG. 4 shows a piece of preferred dimple disposed on a sliding face related to the present invention.

Figure 6:
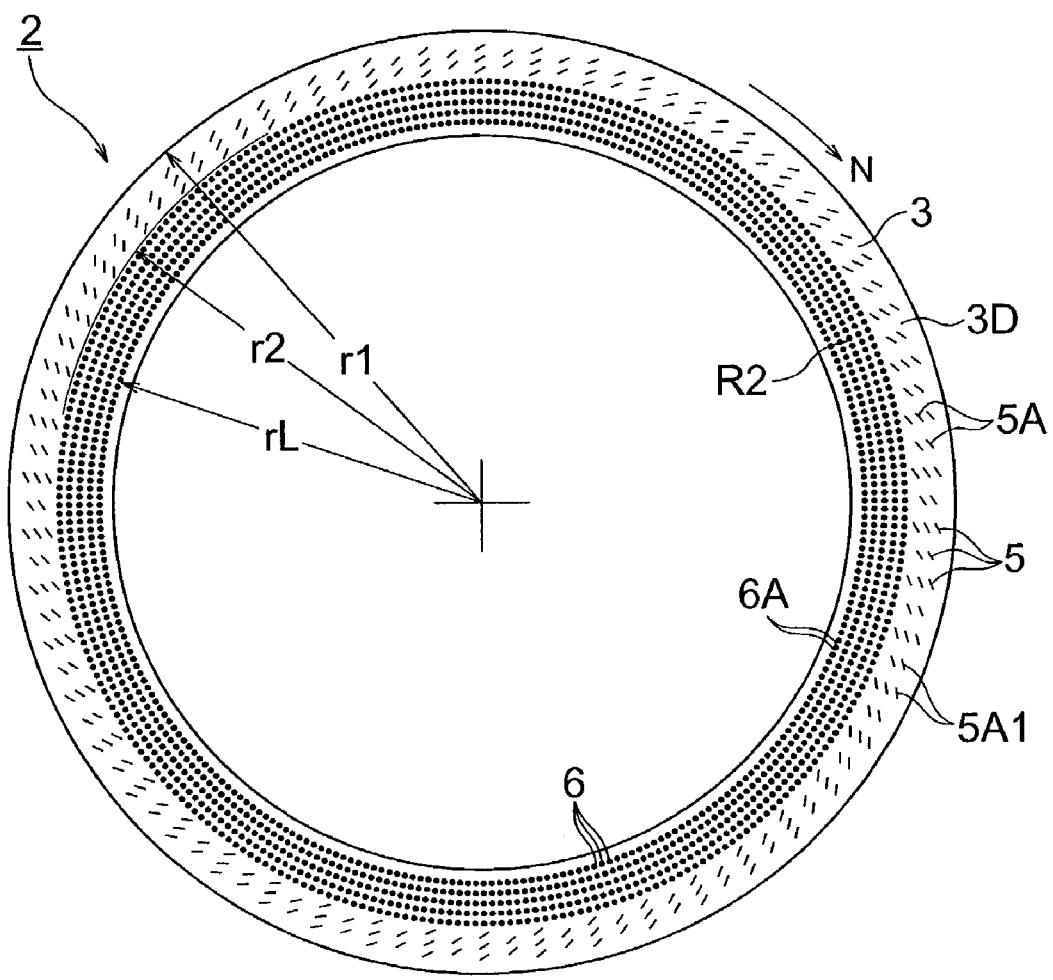
FIG. 6 is a front view of a sliding face of a sliding element representing a fourth preferred embodiment related to the present invention.

>FIG. 6 shows a sliding face of a sliding element representing a preferred fourth embodiment related to the present invention.

Figure 7:
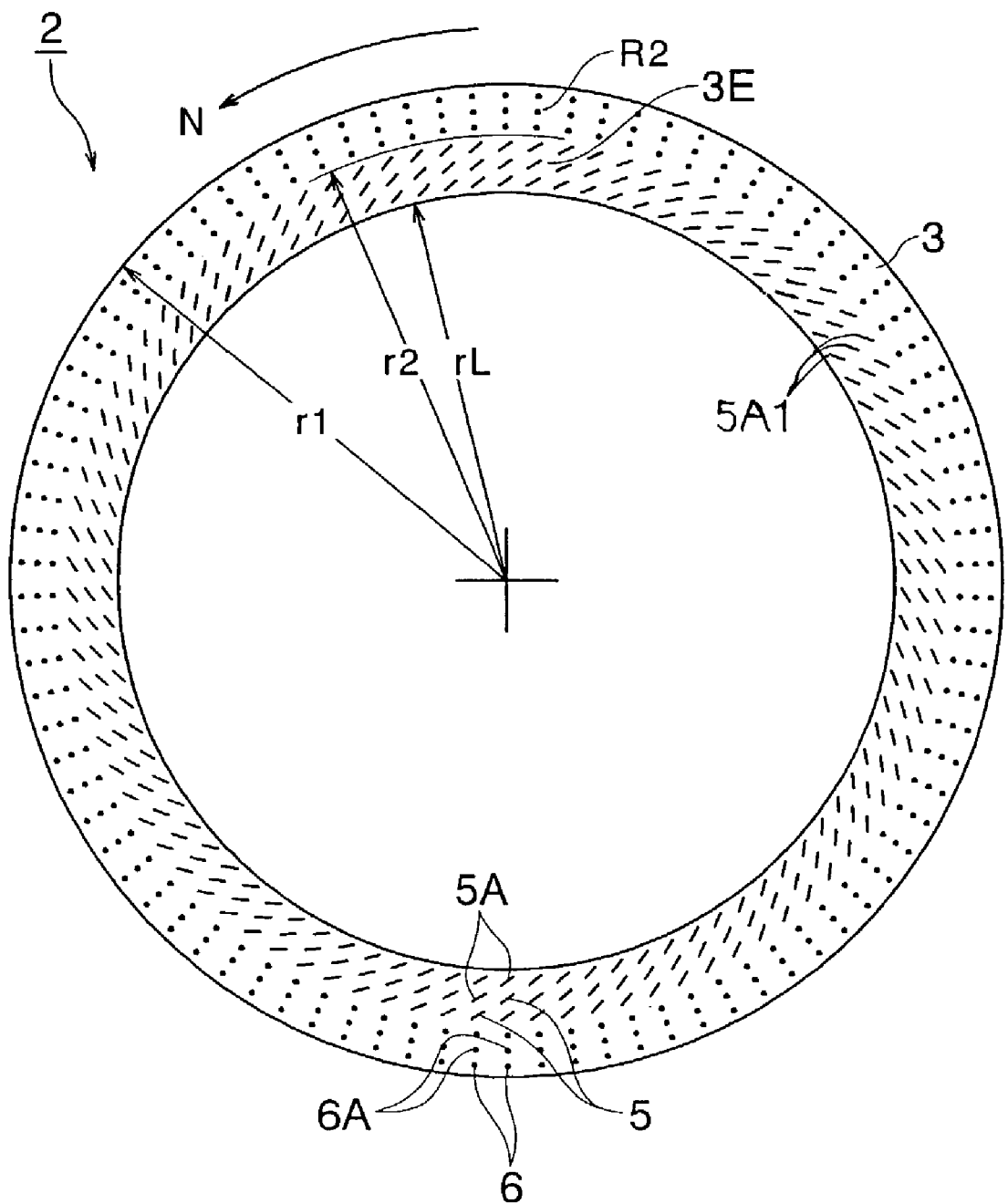
FIG. 7 is a front view of a sliding face of a sliding element representing a fifth preferred embodiment related to the present invention.

>FIG. 7 shows a sliding face of a sliding element representing a preferred fifth embodiment related to the present invention.

FIG. 1 shows the arrangement of dimples 5 disposed on a sliding face 3 of a sliding element 2. The sliding element 2 seals a process fluid which is located on one side of the element. The element, for example, is installed in a mechanical seal or the like.

>Also it is used for a bearing or the like which is subjected to sliding motions relative to a rotary shaft while sealing a lubricant oil between the sliding faces.

>And the sliding element 2 for the arrangement shown in FIG. 1 rotates in a counter-clockwise manner. That is, this sliding element 2 disposes the first sliding face 3A with dimples either in the process fluid side or in the lubricant oil side.

The sliding face 3 of the sliding element 2 is defined by a circumferential region with a radius in a range of from r1 to rL in which a portion of the region with a radius in a range of from r1 to r2 defines a first sliding face 3A having dimples. The first sliding face 3A with dimples disposes dimples 5 which are directly prepared on the sliding element 2 starting from near the outer circumferential edge of the radius r1.

>Shape of the dimples 5 is rectangular when viewed from above relative to the first sliding face 3A with dimples. This rectangular dimple 5 is arranged in such a way that the forward edge 5A1 relative to a rotational direction N (see FIG. 4) is inclined outwardly by 30 degrees with respect to a tangential line for the circle with the rotational direction N. Inclined angle C of the dimple 5 is in a range of from 10 to 80 degrees, preferably from 16 to 55 degrees.

>Nine dimples 5 which are thus formed define a dimple array 5A in which the nine dimples 5 are disposed along a radial line in an equally spaced manner.

>The dimples 5 are further arranged such that a plurality of dimple arrays 5A are radially disposed on the first sliding face 3A as shown in FIG. 1.

A plane second sliding face R1 which does not have dimples 5 is located in the inner circumferential side of the sliding face 3.

The plane second sliding face R1 is defined by a region with a radius in a range of from r2 to rL.

The ratio of the first sliding face 3A (r1−r2) relative to the sliding face 3 (r1−rL) is in a range of (r1−r2)/(r1−rL)= 0.25 to 1, more preferably from 0.25 to 0.75. And the sliding face 3 consists of the first sliding face 3A with dimples and the plane sliding face R1.

>The first sliding face 3A with dimples is designed so as to improve the seal performance as well as to reduce the friction coefficient. The sliding face 3A and the plane second sliding face R1 are separated with respect to a circle with a radius r2 which is defined as a boundary reference circle. As the first embodiment, there are examples in which the ratio of the first sliding face 3A with dimples over the sliding face 3 is chosen to be 0.25, 0.5, 0.75 or 1.0.

The sliding element 2 can be made of a hard material such as super hard alloy, silicon carbide, ceramic and so on. In particular, silicon carbide or the like is preferred for the sliding element 2. That is, not only the strength of the sliding element 2 is enhanced but also anti-abrasion ability of the sliding face is improved.

Figure 8:
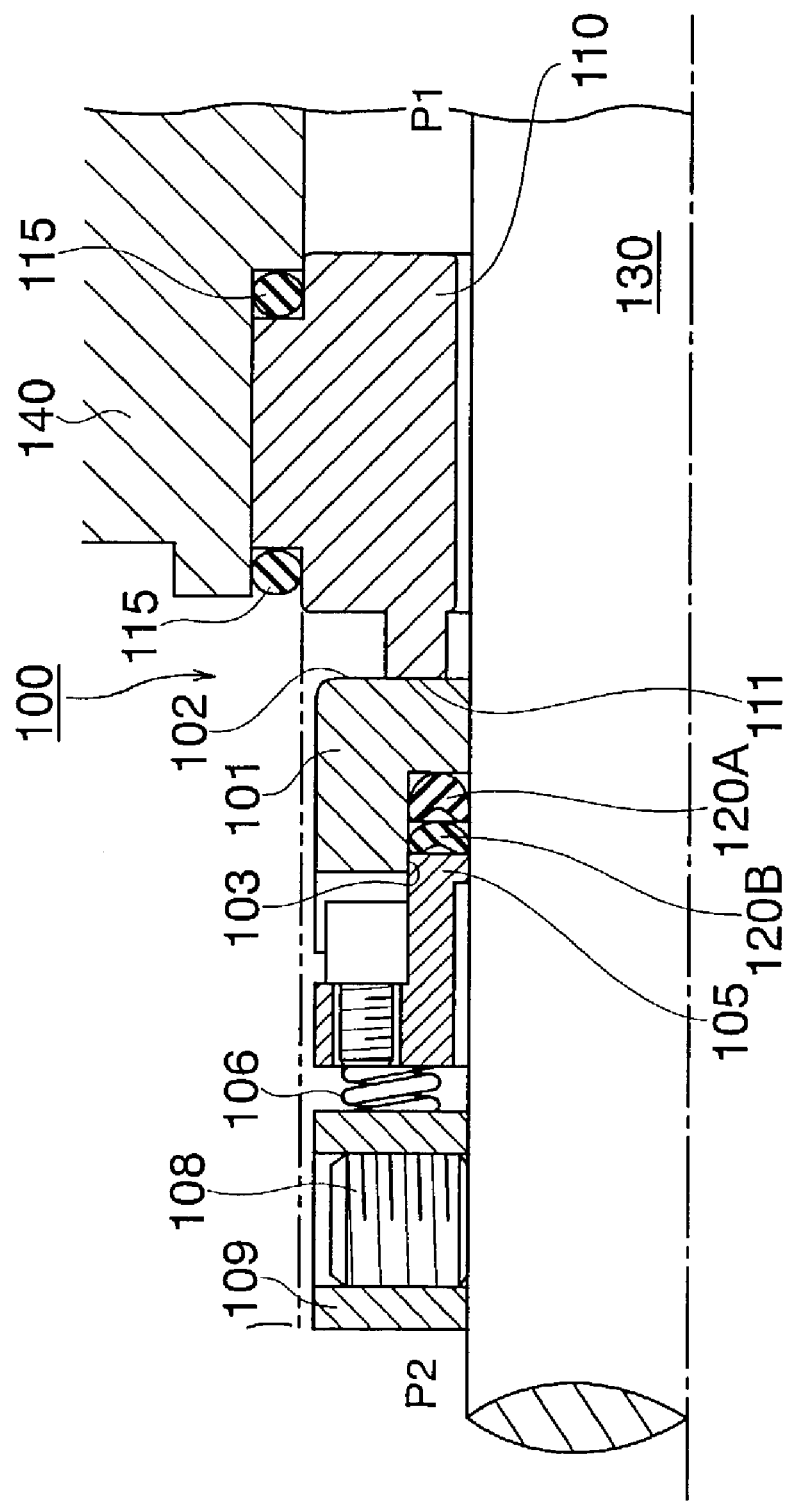
FIG. 8 is a cross-sectional view of a mechanical seal of the prior art related to the present invention.

>Aforementioned prior art shown in FIG. 8, a sintered material retaining porosities, suffers from abrasion of the sliding face and leakage of a lubricant oil or process fluid penetrating through the sliding material. A sliding element 2 of the present invention, however, effectively avoids the problem.

One of the methods for fabricating dimples 5 on the sliding face made of the hard material is a sand blasting in which a photosensitive film for sand blasting is closely placed on the sliding face.

>In this method, a photosensitive film for sand blasting is placed on the sliding face 3. A positive film on which arrays of dimples 5 are printed is closely placed on the photosensitive film, and the photosensitive film is subjected to an exposure. The photosensitive film then is developed and a subsequent sand blasting provides dimples which are identical to those printed on the positive film.

>Form of the dimple 5 as a first example is arranged to have semicircles at its both ends as shown in FIG. 4. Another form as a second example is a rectangle which is not shown as a figure.

>Width A of the rectangular dimple 5 is in a range of from $150 \times 10^{-6}$ m to $1000 \times 10^{-6}$ m. Specific examples for the width A is $150 \times 10^{-6}$ m or $250 \times 10^{-6}$ m. Longitudinal length B of the dimple 5 is more than twice of the width A and less than the width of the sliding face 3. For example, a typical length B of the dimple array B is $600 \times 10^{-6}$ m or $1000 \times 10^{-6}$ m. Also a depth of the dimple 5 is in a range of from $1 \times 10^{-6}$ m to $25 \times 10^{-6}$ m.

FIG. 2 shows a second embodiment of the present invention in which a first sliding face 3B with dimples 5 is located toward the inner circumferential side relative to the boundary reference circle of radius r1. The forward edge 5A1 of the dimple 5 relative to a rotational direction N of the sliding face 3 is inclined inwardly with respect to the rotational direction N.

>Dimples 5 of the first sliding face 3B are arranged in a radial manner with respect to the axial center similarly to the dimples shown in FIG. 1. Dimples 5 disposed in the inner circumferential side of the first sliding face 3B cover from near the inner circumferential edge through the entire area of the first sliding face 3B with dimples. Thus, it allows a process fluid located in the inner circumferential side to flow in.

Shape of the dimples 5 is rectangular when viewed from above. This rectangular dimple 5 is arranged in such a way that the forward edge 5A1 relative to a rotational direction N is inclined inwardly by 25 degrees with respect to a tangential line for the circle with the rotational direction. Inclined angle C of the dimple 5 is in a range of from 10 to 80 degrees, preferably from 16 to 55 degrees.

Nine dimples 5 which are thus formed define a dimple array 5A in which the nine dimples 5 are disposed along a radial line in an equally spaced manner.

The dimples 5 are further arranged such that a plurality of dimple arrays 5A are radially disposed on the first sliding face 3B as shown in FIG. 2.

Other forms and material are more or less the same as the sliding element 2 shown in FIG. 1.

There have been other examples in terms of the form of the dimple 5 such as elliptic or guitar-form. Inclination angle C of the dimple 5 is made 20 or 30 degrees with respect to a tangential line of a rotational circle. The inclination angle C is determined based on the design of a friction coefficient, seal ability and so on. It is known that decreasing this inclination angle C leads to improved seal ability. It also is seen that increasing the angle C tends to decrease the friction resistance. The inclination angle C of the dimple 5 is in a range of from 10 to 80 degrees, preferably from 16 to 55 degrees for having an effect of friction coefficient reduction.

FIG. 3 shows a sliding element 2 as a third embodiment related to the present invention. Inclined angle of the dimples 5 in FIG. 3 is approximately 30 degrees.

The inclined angle C of the dimples 5 is in a range of from 10 to 80 degrees, preferably in a range of from 16 to 55 degrees.

A first sliding face 3C with dimples is defined in a range of the radius r1 to r2 out of the sliding face 3. An outer circumferential area in a range of rh to r1 and an inner circumferential area in a range of r2 to rL relative to the first sliding face 3C with dimples are plane surfaces defined as a second sliding face R1. Experiments with the plane second sliding face R1 which disposes dimples 6 which are smaller than dimples 5 of the first sliding face 3C yielded good results.

There exists another example in which one of the two second sliding faces R1, R1 which is located on the process fluid side retains the second dimples 6 on its surface and the other second sliding face R1 is made a plane surface. There is also a case yielding good results depending on the nature of the process fluid where the second sliding face R1 on the fluid side is made plane and the other second sliding face R1 retains the second dimples 6.

Form of the dimple 5 disposed on the first sliding face 3C is made rectangular, elliptical, guitar-form or cruciform. Other forms and material are more or less the same as the sliding element 2 shown in FIG. 1.

Therefore, elaborating the shape of the dimple 5 will lead to not only improvement of the seal performance but also decrease of the friction coefficient of the sliding face.

In addition, an appropriate choice of the inclined angle C and the number of the dimples 5 also will improve the seal performance and the friction coefficient.

FIG. 6 shows a sliding element 2 as a fourth embodiment related to the present invention.

In FIG. 6, a process fluid is assumed to be located in the outer circumferential side of the sliding element 2. For example, the sliding element 2 is mounted in a mechanical seal or the like and retains a first sliding face 3D with dimples in the fluid side. In another example, the sliding element 2 is installed in a bearing or the like in which a first sliding face 3D with dimples is disposed on the lubricant side for sliding relative to a rotary shaft by retaining the lubricant on the sliding face.

The sliding element 2 rotates in a clockwise manner as shown in FIG. 6. That is, this sliding element 2 disposes the first sliding face 3D with dimples either in the process fluid side of the mechanical seal or in the lubricant oil side of the bearing.

Sliding face 3 of the sliding element 2 is defined by a circumferential region with a radius in a range of from r1 to rL in which a portion of the region with a radius in a range of from r1 to r2 defines a first sliding face 3D having dimples. The first sliding face 3D with dimples disposes dimples 5 which are directly prepared on the sliding element 2 starting from near the outer circumferential edge of the radius r1 to an inward direction.

Shape of the dimples 5 is rectangular when viewed from above relative to the first sliding face 3D with dimples. This rectangular dimple 5 is arranged in such a way that the forward edge 5A1 relative to a rotational direction N is inclined outwardly by 30 degrees with respect to a tangential line for the rotational circle of the sliding face 3. Inclined angle C of the dimple 5 is in a range of from 10 to 80 degrees, preferably from 16 to 55 degrees.

Three dimples 5 which are thus formed define a dimple array 5A in which the three dimples 5 are disposed along a radial line in an equally spaced manner.

The dimples 5 are further arranged such that a plurality of dimple arrays 5A are radially disposed on the first sliding face 3D as shown in FIG. 6.

A second sliding face R2 which is located in the inner circumferential side of the sliding face 3 disposes second dimples 6 whose shape is smaller than the maximum length of the dimple 5 as shown in FIG. 6. The form of the second dimple 6 is a circle, square, rhombus, ellipse or rectangle which is not inclined radially or axially, and there include a plurality of the second dimples 6 which take one or more than one of these forms. A plurality of the second dimples 6 form a dimple array 6A radially disposed on the second sliding face R2. Furthermore, a plurality of such dimple arrays 6A are radially arranged in an equally spaced manner along the circumferential direction. When the second dimples 6 are small in size, the dimples 6 may be disposed at random on the second sliding face R2.

The second sliding face R2 is defined by a region with a radius in a range of from r2 to rL.

The ratio of the first sliding face 3D (r1−r2) relative to the sliding face 3 (r1−rL) is in a range of (r1−r2)/(r1−rL)= 0.25 to 1, more preferably from 0.25 to 0.75. And the sliding face 3 consists of the first sliding face 3D with dimples and the second sliding face R2.

The first sliding face 3D with dimples is designed so as to improve the seal performance as well as to reduce the friction coefficient. The first sliding face 3D with dimples and the second sliding face R2 are separated with respect to a circle with a radius r2 which is defined as a boundary reference circle. As the fourth embodiment, there are examples in which the ratio of the first sliding face 3D with dimples over the sliding face 3 is chosen to be 0.25, 0.5, 0.75 or 1.0.

The sliding element 2 can be made of a hard material such as super hard alloy, silicon carbide, ceramic and so on. In particular, silicon carbide or the like is preferred for the sliding element 2. For silicon carbide, not only the strength of the sliding element 2 is enhanced but also anti-abrasion ability of the sliding face is improved.

Aforementioned prior art shown in FIG. 8, a sintered material retaining porosities, suffers from abrasion of the sliding face and leakage of a lubricant oil or process fluid penetrating through the sliding material. A sliding element 2 of the present invention, however, effectively avoids the problem.

One of the methods for fabricating dimples 5 on the sliding face made of the hard material is a sand blasting in which a photosensitive film for sand blasting is closely placed on the sliding face.

In this method, a photosensitive film for sand blasting is placed on the sliding face 3. A positive film on which arrays of dimples 5 are printed is closely placed on the photosensitive film, and the photosensitive film is subjected to an exposure. The photosensitive film then is developed and a subsequent sand blasting provides dimples which are identical to those printed on the positive film.

There is an example in which the form of the dimple 5 is arranged to have semicircles at its both ends as shown in FIG. 4. Another form of a different example is a rectangle. And the inclined angle C has its forward edge 5A1 relative to a rotational direction facing downward (dimple 5A1 shown by a dotted line in FIG. 4) as opposed to the former case of FIG. 4.

Width A of the rectangular dimple 5 is in a range of from $150 \times 10^{-6}$ m to $1000 \times 10^{-6}$ m. Specific examples for the width A is $150 \times 10^{-6}$ m or $250 \times 10^{-6}$ m. Longitudinal length B of the dimple 5 is more than $500 \times 10^{-6}$ m and larger than the width A and less than the width of the sliding face 3. For example, a typical length B of the dimple array B is $600 \times 10^{-6}$ m or $750 \times 10^{-6}$ m. Also a typical depth of the dimple 5 is $8 \times 10^{-6}$ m or $10 \times 10^{-6}$ m.

FIG. 7 shows a sliding element as a fifth embodiment of the present invention. In the sliding element 2, a first sliding face 3E with dimples 5 is located toward the inner circumferential side relative to the boundary reference circle of radius r2. The forward edge 5A1 of the dimple 5 relative to a rotational direction N of the sliding face 3 is inclined toward the process fluid side (toward the inner diameter) with respect to the rotational direction N. Dimples 5 of the first sliding face 3E are arranged in a radial manner with respect to the axial center as shown in FIG. 7. Dimples 5 disposed in the inner circumferential side of the first sliding face 3E cover from near the inner circumferential edge through the entire area of the first sliding face 3E with dimples. Thus, it allows a process fluid located in the inner circumferential side to flow in.

Shape of the dimples 5 is rectangular when viewed from above. This rectangular dimple 5 is arranged in such a way that the forward edge 5A relative to a rotational direction N is inclined inwardly by 25 degrees with respect to a tangential line for the circle with the rotational direction. Inclined angle C of the dimple 5 is in a range of from 10 to 80 degrees, preferably from 16 to 55 degrees.

Three dimples 5 which are thus formed define a dimple array 5A in which the three dimples 5 are disposed along a radial line in an equally spaced manner. The number of the dimples involved in a dimple array 5A arbitrarily varies from one to ten.

The dimples 5 are further arranged in such a way that the dimple arrays 5A are radially disposed on the first sliding face 3E in more or less equally a spaced manner as shown in FIG. 7.

Other forms and material are more or less the same as the sliding element 2 shown in FIG. 1.

It is preferable for the form of the above dimple 5 to be chosen so that the form does not easily deteriorate due to abrasion dust. Therefore, the form and the orientation of the dimple 5 should be designed such that thickness of a lubrication film caused by a process fluid is increased.

Fabrication methods of the dimple 5 other than the method previously mentioned include use of an etching process or a reaction process with other solid metals.

Sliding element 2 related to the present invention can be used in a mechanical seal, bearing or the like.

In case of a use in a mechanical seal, the sliding element 2 can be utilized for either a stationary seal ring or a rotary seal ring or both rings. That is, when dimples 5 are disposed on only one seal ring, the other seal ring retains a plane seal face which forms a sealing contact with the seal ring with dimples.

In case of an application to a bearing, the sliding element 2 can be utilized for a sliding face supporting a radial load or a thrust load exerted to a rotary shaft. In particular, in case of lubricant oil being located toward the apparatus body along the axial direction, the inclined angle C of the dimple 5 is chosen so that the lubricant oil is pumped up toward the lubricating sliding face.

Figure 5:
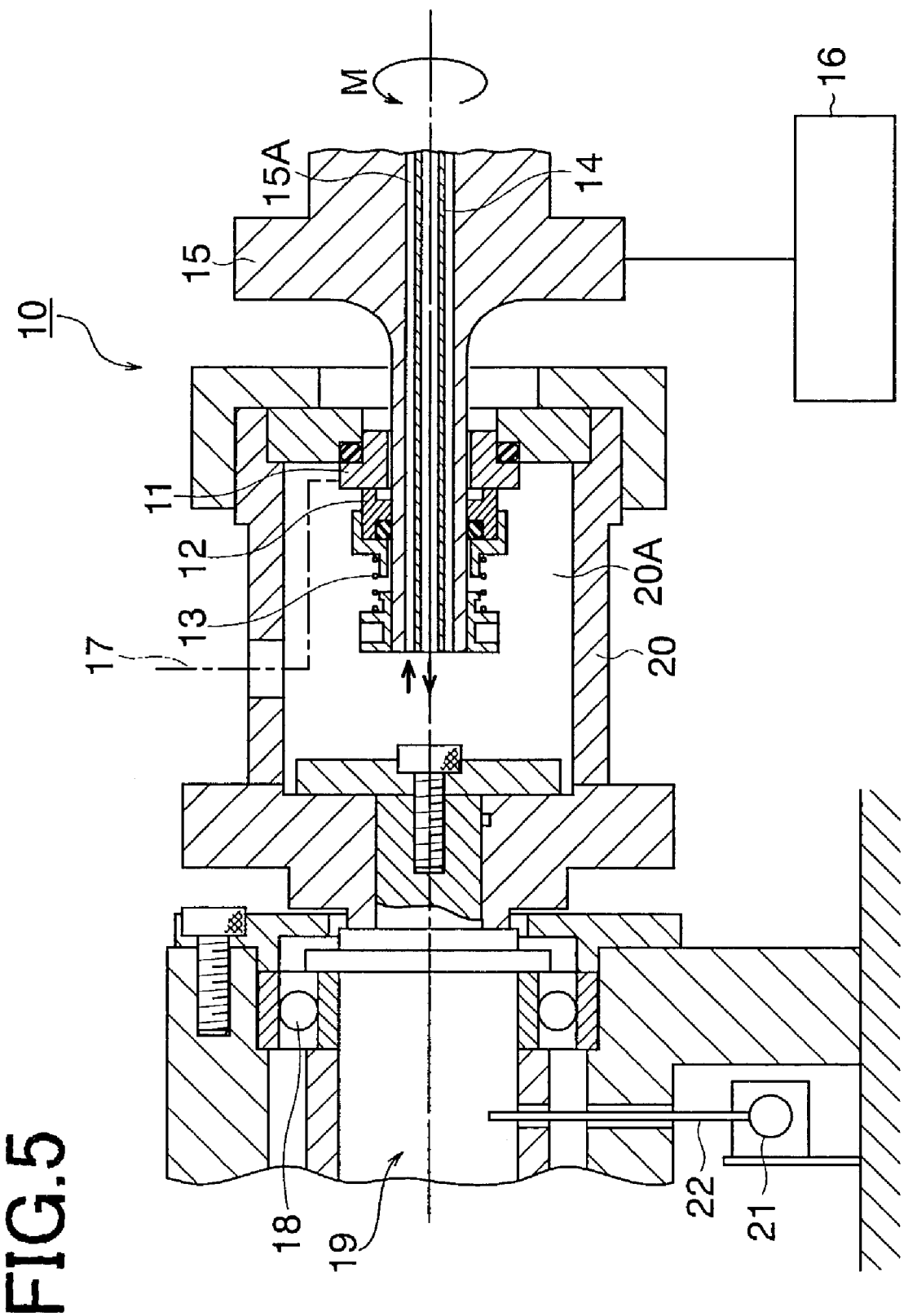
FIG. 5 is a cross-sectional view of a testing apparatus for evaluating a sliding element related to the present invention.

FIG. 5 is a cross-sectional view of a mechanical seal testing apparatus for evaluating a sliding element 2 related to the present invention.

The testing apparatus 10 for the sliding element 2 shown in FIG. 5 retains a rotatable, cylindrical housing 20 along the center axis. A stationary seal ring 11 is sealingly fitted via a O-ring to a mating surface disposed in a process fluid chamber 20A within the housing 20. The rotary seal ring 12 is resiliently urged by a spring in an axially movable manner relative to a retainer 13 which is fixed to the rotary shaft 15. And the sealing contact of the seal face of the rotary seal ring 12 and the opposite seal face of the stationary seal ring 11 prevents the fluid inside the process fluid chamber 20A from leaking to the ambient.

A drain passage 15A is disposed along the axis of the rotary shaft 15 driven by a motor 16. A supply passage 14 is disposed inside the drain passage 15A by extending through the drain passage 15A. Process fluid, e.g., oil, introduced from the supply passage 14 is provided into the process fluid chamber 20A and is ejected from the drain passage 15A. Ends of the drain passage 15A and the supply passage 14 are connected to a circulation pipe, which is not shown in the figure, and a pump connected to the pipe circulates the fluid modulated at a specific temperature and pressure. The rotational speed of the motor 16 can be controlled by an inverter which is not shown in the figure.

The housing 20 retaining the stationary seal ring 11 is fixed to the shaft 19 which is supported by a bearing 18 in a freely rotatable manner. Thus, the housing 20 is rotatable by a sliding friction which is caused by a relative rotation of the stationary seal ring 11 and the rotary seal ring 12.

A hole whose diameter is 2 mm is disposed in 1 mm away from the opposing seal face of the stationary seal ring 11 and the hole is connected to an end of a conductive line 17 such as PlatinumRhodium-Platinum or Alumel-Chromel whose other end is connected to a thermo-electric thermometer which is not shown in the figure. Temperature of the sliding face of the stationary seal ring 11 is measured by the thermo-electric thermometer.

Support block which supports the shaft 19 is equipped with a load cell 21 and a sliding torque M can be measured by way of a cantilever 22. The friction coefficient F then is computed from the sliding torque M. Its deriving formula is $F = M/(W \times Rm)$ where W is a load and Rm is an average radius of the sliding face.

This testing apparatus is internal-flow unbalancing type, and the seal face is urged by the fluid pressure and the resiliently urging force of a spring. In case of a zero fluid pressure, the sliding face is urged by the spring of the retainer 13 alone. Measured items by this testing apparatus include the sliding torque M of the sliding element 2, temperature of the sliding face 3, fluid temperature and a volume of the fluid leaked through the sliding face 3.

EXAMPLES

Example 1

1) Sliding elements 2 shown in FIG. 1 and FIG. 3 were subjected to the tests.
2) The sliding elements 2 were tested by a testing apparatus 10 shown in FIG. 5.
3) Form of dimples 5 of the sliding element 2
 a. A rotary seal ring is a silicon carbide sliding element (inner diameter 25 mm, outer diameter 44 mm, length 12 mm),
 b. A stationary seal ring is also a silicon carbide sliding element (inner diameter 28 mm, outer diameter 50 mm, length 14 mm),
 c. An arrangement of the dimples 5 is as shown in FIG. 1 or FIG. 3.
 d. The width A of the dimple is $150 \times 10^{-6}$ m, the length B $600 \times 10^{-6}$ m, and the depth H $8 \times 10^{-6}$ m.
 e. Ratio of the first sliding face 3A, 3C with dimples over the sliding face 3 is given by $(r1-r2)/(r1-rL)=1.0$.
 f. Inclined angle C of the dimples 5 is 30 degrees.
4) Surface roughness of the sliding face is Rz $0.2 \times 10^{-6}$ m,
5) Flatness is 1 band (helium light),
6) Testing duration is 30 minutes,
7) Temperature of the process fluid is 30 degree Celsius,
8) Fluid pressure is 0.3 MPa, 0.5 MPa, 1.0 MPa,
9) Circumferential edge velocity is 1 m/s,
10) Spring load is 20N,
11) Process fluid is Super Multi Oil 10 manufactured by IDEMITSU Co., Ltd.

Testing results with regard to friction coefficient and leakage of the process fluid (g/h) obtained under these conditions are shown in Table 1.

In individual tables given below, A represents a process fluid pressure (MPa) while B represents a ratio (%) of the friction coefficient of the sliding element of the present invention over the friction coefficient of the sliding face without dimples.

TABLE 1

| A (MPa) | Friction coefficient | B (%) | Leakage of a process fluid (g/h) |
|---|---|---|---|
| 0.3 | 0.097 | 57 | 0.0814 |
| 0.5 | 0.102 | 73 | 0.0782 |
| 1.0 | 0.107 | 84 | 0.1344 |

Example 2

1) Sliding elements 2 is shown in FIG. 1 and FIG. 3.
2) Ratio of the first sliding face 3A, 3C with dimples over the sliding face 3 is given by $(r1-r2)/(r1-rL)=1.0$.
3) Form of dimples 5 of the sliding element 2
 a. The width A of the dimple is $250 \times 10^{-6}$ m, the length B $1000 \times 10^{-6}$ m, and the depth H $8 \times 10^{-6}$ m.
4) Other conditions are the same as those in the example 1.

Testing results with regard to friction coefficient and leakage of the process fluid (g/h) obtained under these conditions are shown in Table 2.

In individual tables given below, A represents a process fluid pressure (MPa) while B represents a ratio (%) of the friction coefficient of the sliding element of the present invention over the friction coefficient of the sliding face without dimples.

TABLE 2

| A (MPa) | Friction coefficient | B (%) | Leakage of a process fluid (g/h) |
|---|---|---|---|
| 0.3 | 0.021 | 12 | 1.0368 |
| 0.5 | 0.032 | 23 | 0.1838 |
| 1.0 | 0.047 | 36 | 0.1416 |

Example 3

1) Sliding elements 2 are shown in FIG. 1 and FIG. 3.
2) Ratio of the first sliding face 3A, 3C with dimples over the sliding face 3 is given by $(r1-r2)/(r1-rL)=0.75$.
3) Form of dimples 5 of the sliding element 2
 a. The width A of the dimple is $150 \times 10^{-6}$ m, the length B $600 \times 10^{-6}$ m, and the depth H $8 \times 10^{-6}$ m.
4) Other conditions are the same as those in the example 1.

Testing results with regard to friction coefficient and leakage of the process fluid (g/h) obtained under these conditions are shown in Table 3.

In individual tables given below, A represents a process fluid pressure (MPa) while B represents a ratio (%) of the friction coefficient of the sliding element of the present invention over the friction coefficient of the sliding face without dimples.

TABLE 3

| A (MPa) | Friction coefficient | B (%) | Leakage of a process fluid (g/h) |
|---|---|---|---|
| 0.3 | 0.076 | 44 | 0.0870 |
| 0.5 | 0.077 | 55 | 0.1072 |
| 1.0 | 0.107 | 83 | 0.1012 |

Example 4

1) Sliding elements 2 are shown in FIG. 1 and FIG. 3.
2) Ratio of the first sliding face 3A, 3C with dimples over the sliding face 3 is given by $(r1-r2)/(r1-rL)=0.50$.
3) Form of dimples 5 of the sliding element 2
 a. The width A of the dimple is $150 \times 10^{-6}$ m, the length B $600 \times 10^{-6}$ m, and the depth H $8 \times 10^{-6}$ m.
4) Other conditions are the same as those in the example 1.

Testing results with regard to friction coefficient and leakage of the process fluid (g/h) obtained under these conditions are shown in Table 4.

In individual tables given below, A represents a process fluid pressure (MPa) while B represents a ratio (%) of the friction coefficient of the sliding element of the present invention over the friction coefficient of the sliding face without dimples.

TABLE 4

| A (MPa) | Friction coefficient | B (%) | Leakage of a process fluid (g/h) |
|---|---|---|---|
| 0.3 | 0.073 | 43 | 0.0466 |
| 0.5 | 0.060 | 42 | 0.0428 |
| 1.0 | 0.087 | 68 | 0.0684 |

Example 5

1) Sliding elements 2 are shown in FIG. 1 and FIG. 3.
2) Ratio of the first sliding face 3A, 3C with dimples over the sliding face 3 is given by (r1−r2)/(r1−rL)=0.25.
3) Form of dimples 5 of the sliding element 2
   a. The width A of the dimple is $150 \times 10^{-6}$ m, the length B $600 \times 10^{-6}$ m, and the depth H $8 \times 10^{-6}$ m.
4) Other conditions are the same as those in the example 1.

Testing results with regard to friction coefficient and leakage of the process fluid (g/h) obtained under these conditions are shown in Table 5.

In individual tables given below, A represents a process fluid pressure (MPa) while B represents a ratio (%) of the friction coefficient of the sliding element of the present invention over the friction coefficient of the sliding face without dimples.

TABLE 5

| A (MPa) | Friction coefficient | B (%) | Leakage of a process fluid (g/h) |
|---|---|---|---|
| 0.3 | 0.076 | 44 | 0.0300 |
| 0.5 | 0.066 | 47 | 0.0400 |
| 1.0 | 0.085 | 66 | 0.0352 |

Example 6

1) Sliding elements 2 are shown in FIG. 6 and FIG. 7.
2) Ratio of the first sliding face 3D, 3E with dimples over the sliding face 3 is given by (r1−r2)/(r1−rL)=0.50.
3) Form of dimples 5 of the sliding element 2
   a. Dimples 5 of the first sliding face 3D, 3E are made as follows;
      the width A is $150 \times 10^{-6}$ m,
      the length B is $600 \times 10^{-6}$ m and
      the depth H is $8 \times 10^{-6}$ m.
   b. Second dimples 6 of the second sliding faces R1, R2 are circular;
      diameter is $100 \times 10^{-6}$ m and
      depth is $8 \times 10^{-6}$ m.
4) Other conditions are the same as those in the example 1.

Testing results with regard to friction coefficient and leakage of the process fluid (g/h) obtained under these conditions are shown in Table 6.

In individual tables given below, A represents a process fluid pressure (MPa) while B represents a ratio (%) of the friction coefficient of the sliding element of the present invention over the friction coefficient of the sliding face without dimples.

TABLE 6

| A (MPa) | Friction coefficient | B (%) | Leakage of a process fluid (g/h) |
|---|---|---|---|
| 0.3 | 0.076 | 44 | 0.0412 |
| 0.5 | 0.065 | 46 | 0.0094 |
| 1.0 | 0.075 | 58 | 0.0152 |

Reference Case

Figure 9:
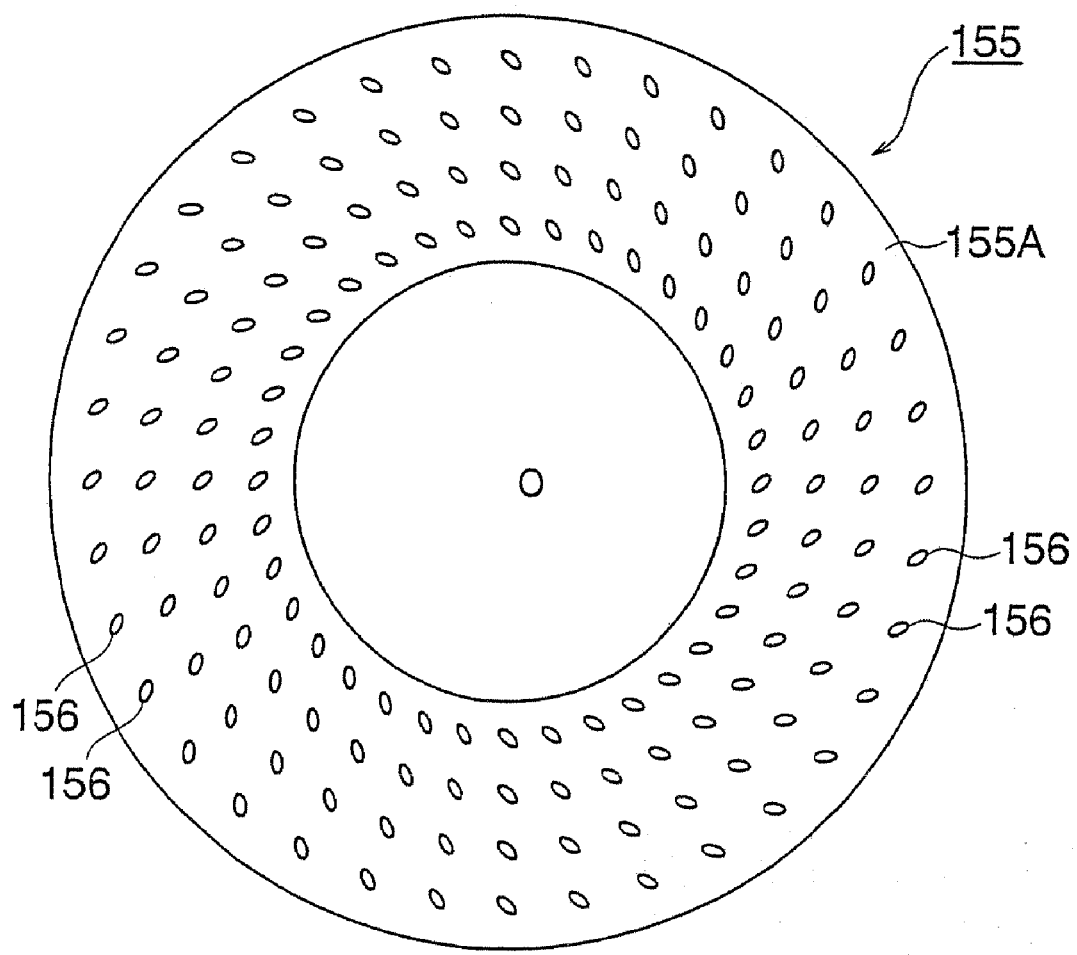
FIG. 9 is a front view of a sliding face disposing dimples in a sliding element of the prior art related to the present invention.

1) A sliding element (corresponding to a driven ring 155 in FIG. 9) is similar to the relative art of FIG. 9.
2) Ratio of a sliding face 155A with dimples over a sliding face 155 is 1.0 (the form and arrangement of the dimples 5 is similar to the first sliding face 3C of FIG. 3).
3) Form of dimples (concave 156)
   a. The width A of the concave 156 is $50 \times 10^{-6}$ m, the length B $200 \times 10^{-6}$ m, and the depth H $8 \times 10^{-6}$ m.
4) Other conditions are the same as those in the example 1.

Testing results with regard to friction coefficient and leakage of the process fluid (g/h) obtained under these conditions are shown in Table 7.

In individual tables given below, A represents a process fluid pressure (MPa) while B represents a ratio (%) of the friction coefficient of the sliding element of the present invention over the friction coefficient of the sliding face without dimples.

TABLE 7

| A (MPa) | Friction coefficient | B (%) | Leakage of a process fluid (g/h) |
|---|---|---|---|
| 0.3 | 0.132 | 77 | 0.0982 |
| 0.5 | 0.109 | 77 | 0.0248 |
| 1.0 | 0.119 | 93 | 0.0242 |

Above examples 1 through 6 and the reference case are compared below.

Firstly leakage of the process fluid (g/h) is discussed according to Table 1 through Table 6. The leakage values indicated in those figures are below a standard (less than 3 ml/h) based on numerous actual achievements worldwide. The leakage can be further reduced by introducing a plane sliding face R1 on the sliding face 3.

Now the examples 1 through 5 are compared with the reference case while a fluid leakage is being kept within a permissible range. The friction coefficient of the reference case relative to the friction coefficient observed for a sliding between two plane sliding faces is in a range of from 77% to 93%. On the other hand, the example 1 exhibits a range of 57% to 84%, the example 2 12% to 36%, the example 3 44% to 83%, the example 4 43% to 68%, the example 5 44% to 66%, and the example 6 44% to 58%. That is, the friction coefficient can be significantly decreased compared with the reference case.

In particular, a small pressure of the process fluid can further decrease the friction coefficient. Also increasing the length of the dimples 5 is expected to decrease the friction coefficient. A slow rotational speed of the sliding element 2 is effective for reducing the friction coefficient as well.

As far as the form of a dimple 5 disposed on the sliding face 3 of the sliding element 2 is concerned, the width is more than $100 \times 10^{-6}$ m and less than $1000 \times 10^{-6}$ m and the length is more than $500 \times 10^{-6}$ m and longer than the width of the dimple 5 and shorter than the radial width of the sliding face 3.

Also the depth of the dimple 5 is in a range of from $1 \times 10^{-6}$ m to $25 \times 10^{-6}$ m.

Shape of the dimple 5 thus created is preferably rectangular, elliptic, guitar-form or cruciform.

This sliding element 2 is suitable for a seal ring of mechanical seal used in a chemical reactor or the like. In particular, the element 2 is even more effective when the sliding face 3 of the seal ring is subjected to a slow rotational speed and the fluid pressure is rather high.

Other inventions related to the present invention will be described below.

A sliding element 2 of the fourth, fifth or sixth invention retains a plurality of dimple arrays 5A each of which consists of dimples 5 being disposed along a radial line. These dimple arrays 5A are radially disposed along a circumferential direction.

In the sliding element 2 of the fourth, fifth or sixth invention, dimples 5 disposed on the first sliding face 3D are inclined toward the process fluid side and orderly located in a radial direction as well as in a circumferential direction. Therefore, the process fluid is evenly introduced onto the sliding face 3 and a uniform lubricant film of the fluid retained between the sliding faces acts to maintain a low friction coefficient. The second seal faces R1, R2 also achieve an outstanding seal performance.

A sliding element 2 of the seventh invention retains the second dimples 2 whose shape is a circle, square, rhomboid, or a rectangle or an ellipsoid which is aligned with a diametric or axial direction.

In the sliding element 2 of the seventh invention, dimples 5 disposed on the first sliding face 3E evenly introduce and retain the process fluid onto the sliding face 3E, and the second sliding face R2 disposes dimples 6 whose shape is a circle, square, rhomboid, or a rectangle or an ellipsoid which is aligned with a diametric or axial direction. Therefore, a pumping effect for pushing back the lubricant film introduced onto the first sliding face 3E toward the second sliding face R2 will not only improve the seal performance but also decrease the friction coefficient.

And the second sliding face R2 will enhance its seal performance by means of small dimples 6.

A sliding element 2 of the eight, ninth or tenth invention has a first sliding face 3A, 3B, 3C disposing dimples 5 whose radial width relative to the entire radial width of the sliding face 3 is made in a range of from 0.25 to 0.75.

In the sliding element 2 of the eight, ninth or tenth invention where the radial width of the first sliding face 3A, 3B, 3C relative to the entire radial width of the sliding face 3 is made in a range of from 0.25 to 0.75, the friction coefficient is decreased by 40 to 60% compared with that of the plane sliding face and a seal performance is improved as well.

Merits of the present invention will be described below.

According to a sliding element of the present invention, the forward edge of the dimple of the first sliding face relative to a tangential line with respect to the rotational direction is inclined for optimally sucking in a process fluid such that the process fluid introduced between the dimples on the sliding face creates a lubricant film of the fluid. The lubricant film of the fluid then remains on the first sliding face by being sealed by the second sliding face. As the result, the friction coefficient of the sliding face is decreased by the lubricant film. Therefore, heat generation of the sliding face is reduced as well. This leads to an effective prevention of abrasion and damage of the sliding face.

Furthermore, the sliding element has a first sliding face with dimples and a plane second sliding face which is located in the opposite side of the process fluid with respect to the first sliding face. Thus, not only the second sliding face reduces the friction coefficient by sealing and uniformly retaining the process fluid on the first sliding face but also effectively seals the fluid by collaborating with the first sliding face.

The sliding element not only can decrease the friction coefficient but also reduce a squeaking noise or a linking during sliding as a result of preventing abrasion of the sliding faces. In addition, use of the sliding element with an opposing sliding element being made of carbon material can prevent Blister effect, hence a resulting improved seal performance against the process fluid.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A sliding element for providing a seal against a process fluid being located in either inner circumference or outer circumference of sliding faces of a pair of relatively slidable sliding components, one of said components being a stationary sliding element and the other of said components being a rotary sliding element, said sliding element comprising:

a) a first sliding face portion of one of said sliding faces being located in said process fluid side;

b) first dimples being disposed on said first sliding face portion, each of said first dimples having at least straight side portions, a maximum length direction of said first dimples being oriented with an inclined angle in a range of from 16 to 55 degrees relative to a tangential direction of a rotational circumference, a longitudinal direction of said first dimples being aligned with said inclined angle, a maximum width of said first dimple being in a range of from $100 \times 10^{-6}$ m to $1000 \times 10^{-6}$ m, a longitudinal length of said first dimple being more than $500 \times 10^{-6}$ m and larger than the width of said first dimple and smaller than the radial width of said first sliding face portion, a depth of said first dimple being in a range of from $1 \times 10^{-6}$ m to $25 \times 10^{-6}$ m; and c) a second sliding face portion of said one of said sliding faces being located in the opposite side relative to said process fluid, said second sliding face portion having second dimples smaller in size than said first dimples, wherein said first dimples are disposed to form first radial lines, a plurality of said first radial lines are disposed along a circumferential direction in a radicalized manner, along each of said first radial lines, at least two first dimples are arranged in order to make a plurality of circles of the first dimples, all of the first dimples along each of said first radial lines are uniformly arrayed and have substantially the same longitudinal length and the same inclined angle, the longitudinal length being greater than the width, said second dimples are disposed to form second radial lines, a plurality of said second radial lines are disposed along a circumferential direction in a radicalized manner, along each of said second radial lines, at least two second dimples are arranged in order to make a plurality of circles of the second dimples, and a ratio of a first radial width (r1-r2 or r2-rL) of said first sliding face portion with respect to a total radial width (r1-rL) of said first and second sliding face portions is from 0.25 to 0.75.

2. A sliding element as in claim 1 wherein the second radial lines of said second dimples correspond to the first radial line of said first dimples.

3. the sliding element as in claim 1 wherein the number of said second dimples is greater than or equal to the number of said first dimples.

* * * * *